(12) United States Patent
Hargreaves et al.

(10) Patent No.: US 9,990,210 B2
(45) Date of Patent: *Jun. 5, 2018

(54) DRIVERLESS PROGRAMMABLE COMPUTER INPUT DEVICES AND RELATED METHODS

(71) Applicant: Kinesis Corporation, Bothell, WA (US)

(72) Inventors: William Rudolph Hargreaves, Bellevue, WA (US); Carsten Buus, Snohomish, WA (US); David Beecher, Redmond, WA (US)

(73) Assignee: Kinesis Corporation, Bothell, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/357,802

(22) Filed: Nov. 21, 2016

(65) Prior Publication Data

US 2017/0199747 A1    Jul. 13, 2017

Related U.S. Application Data

(63) Continuation of application No. 14/713,718, filed on May 15, 2015, now Pat. No. 9,535,581.

(60) Provisional application No. 62/129,353, filed on Mar. 6, 2015, provisional application No. 61/994,707, filed on May 16, 2014.

(51) Int. Cl.
*G06F 13/12*    (2006.01)
*G06F 3/00*    (2006.01)
*G06F 9/44*    (2018.01)
*G06F 3/023*    (2006.01)
*G06F 3/0484*    (2013.01)
*G06F 3/0482*    (2013.01)
*G06F 9/445*    (2018.01)

(52) U.S. Cl.
CPC .......... *G06F 9/4411* (2013.01); *G06F 3/0238* (2013.01); *G06F 3/0482* (2013.01); *G06F 3/04847* (2013.01); *G06F 9/44505* (2013.01)

(58) Field of Classification Search
None
See application file for complete search history.

(56) References Cited

U.S. PATENT DOCUMENTS

| | | |
|---|---|---|
| 2009/0187687 A1 | 7/2009 | Hulbert et al. |
| 2011/0225553 A1 | 9/2011 | Abramson et al. |
| 2013/0063356 A1 | 3/2013 | Martisauskas |
| 2013/0130800 A1 | 5/2013 | Sirilux et al. |
| 2014/0354550 A1 | 12/2014 | Mendonca et al. |

*Primary Examiner* — David E Martinez
(74) *Attorney, Agent, or Firm* — Seed IP Law Group LLP (57) ABSTRACT

Driverless programmable human interface devices are provided that may be configured using plain text configuration information, such as may be viewed or edited by a user. The human interface device may provide a graphical user interface via one or more software applications accessible via a virtual storage volume provided as part of the human interface device, and which may be executed directly by a user without requiring installation. The user may view and modify textual configuration information directly, or may utilize the provided graphical user interface to do so indirectly.

22 Claims, 3 Drawing Sheets

DRIVERLESS PROGRAMMABLE COMPUTER INPUT DEVICES AND RELATED METHODS

TECHNICAL FIELD

The present disclosure relates generally to computer input devices, and in particular to configurable human interface devices, such as programmable computer keyboards, mice, joysticks and foot pedals, with human-readable textual configuration files.

BACKGROUND

Typical computer peripheral devices may rely on generic device drivers, but are therefore unable to provide device-specific functionality other than those common to all devices in the same class or type. For example, a "generic" mouse driver may support basic left-click and right-click operations, but may not support other features of mice hardware, such as middle-click operations or mouse wheel scrolling and side-scrolling. Peripherals offering functionality beyond such basic operations typically require very device-specific drivers to support such greater functionality. In certain instances, such peripheral devices may require entirely separate software that occupies resources of a connected computing system in order to support such functionality. Furthermore, such software typically requires manual installation by a user of the computing system, and is not portable to other computing systems without significant effort by the user.

In addition, while it may be desirable in many instances to assign actions to user-selectable controls of computer input devices other than those actions assigned by the device manufacturer, such advanced configuration typically also requires separate software. Moreover, the configuration information needed to modify the user-selectable controls using such software is often tied to the particular operating system of the computing system that is connected to the device at the time of configuration, and such configuration information is also not typically portable, readable by human users, or easily modified by those users. In some cases, "internal" or "on-board" customization designs for computer input devices may allow users to configure their devices without separate software, but the ability to view and edit the configuration is lost.

BRIEF SUMMARY

Implementations described herein provide driverless programmable computer input devices (hereinafter "human interface devices" or "HID devices") that are configurable using plaintext configuration information, typically stored on the device itself, that may be viewed or edited by a user. The human interface device may in certain implementations provide a "no installation" graphical user interface via one or more software applications which may be accessible via a virtual storage volume ("virtual drive") associated with (and in certain implementations contained by) the human interface device, and which may be executed directly by a user without requiring installation. The user may utilize the provided graphical user interface to configure the human interface device by indirectly editing the textual configuration information, rather than requiring the user to directly edit a file containing the textual configuration information. Textual configuration information and a "no-installation" graphic user interface may be combined with "on-board" programmability for human interface devices, such as computer keyboards.

DETAILED DESCRIPTION

In the following description, certain specific details are set forth in order to provide a thorough understanding of various disclosed implementations. However, one of ordinary skill in the relevant art will recognize that implementations may be practiced without one or more of these specific details, or with other methods, components and functionality. In other instances, well-known structures, devices, features and methods associated with programmable human interface devices or other computer input devices, such as, for example, keyboards, keypads, mice, foot pedals and joysticks, have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one implementation" or "an implementation" means that a particular feature, structure or characteristic described in connection with the implementation is included in at least one implementation. Thus, various instances of the phrases "in one implementation" or "in an implementation" within this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

As used herein, a "human interface device" or "HID device" may refer to any input device capable of providing one or more indications of human interaction with elements of the relevant device to one or more computing systems communicatively coupled to the device. A nonexclusive list of examples of such HID devices include keyboards, mice and other pointing devices, foot pedals, joysticks, musical instruments and other computer input devices.

Also as used herein, the term "actuator" may refer to any transducing element capable of generating an electrical or electronic signal as a result of user interaction. A nonexclusive list of examples of such actuators include electronic, mechanical or electromechanical implementations of keys, buttons, pressure plates, paddles, pedals, wheels, triggers, slides, touchpads, or other touch- or motion-sensitive element, and may be digital or analog in nature.

The present disclosure is directed to computer input devices collectively termed herein "human interface devices" or "HID devices," such as may be connected to a computing system via one or more physical connections (e.g., a USB connection) or other connections (e.g., a Bluetooth or other wireless connection). Additional information regarding such devices may be included in U.S. Patent Application No. 61/994,707, filed May 16, 2014, and hereby incorporated by reference in its entirety; and in U.S. Patent Application No. 62/129,353, filed Mar. 6, 2015, and also hereby incorporated by reference in its entirety. In certain implementations, such devices may be configured by the user in a variety of ways without the need for specialized drivers, such as by utilizing generic drivers typically provided by an operating system ("OS") of a connected computing system. In at least one implementation, simple text files may be used to configure particular functions performed by the human interface device in response to user interactions with one or more actuators of the device. Such text files may typically be viewed and modified by all major operating systems currently in use. Generic drivers for peripheral computer devices, such as generic HID USB devices, are also typically provided in such major operating systems.

Due to the lack of formatting inherent in simple text files (such as depicted as part of the graphical user interface of FIG. 2), particular users may prefer to indirectly view and modify textual configuration information files using a graphical application rather than modifying such files directly. According to some implementations, rather than requiring the user to locate and edit the text file directly, the HID device may include one or more storage components that include a graphical application to provide a graphical user interface ("GUI") that allows such indirect viewing and modification of the relevant textual configuration information files, as depicted in FIG. 3.

In at least one implementation, multiple OS-specific versions of such a graphical application may be provided and made accessible via a virtual storage volume ("virtual drive") associated with and/or contained within the human interface device. The graphical application may provide one or more GUI elements to facilitate modifying one or more actions associated with actuators of the HID device, and may in certain implementations automatically write such modifications to an appropriate textual configuration information file in an appropriate folder, such as a folder locally stored within a memory contained by the HID device itself.

Exemplary implementations are described herein with reference to a USB HID keyboard device, but it will be understood that any HID device may benefit from implementations of the described techniques.

Figure 1:
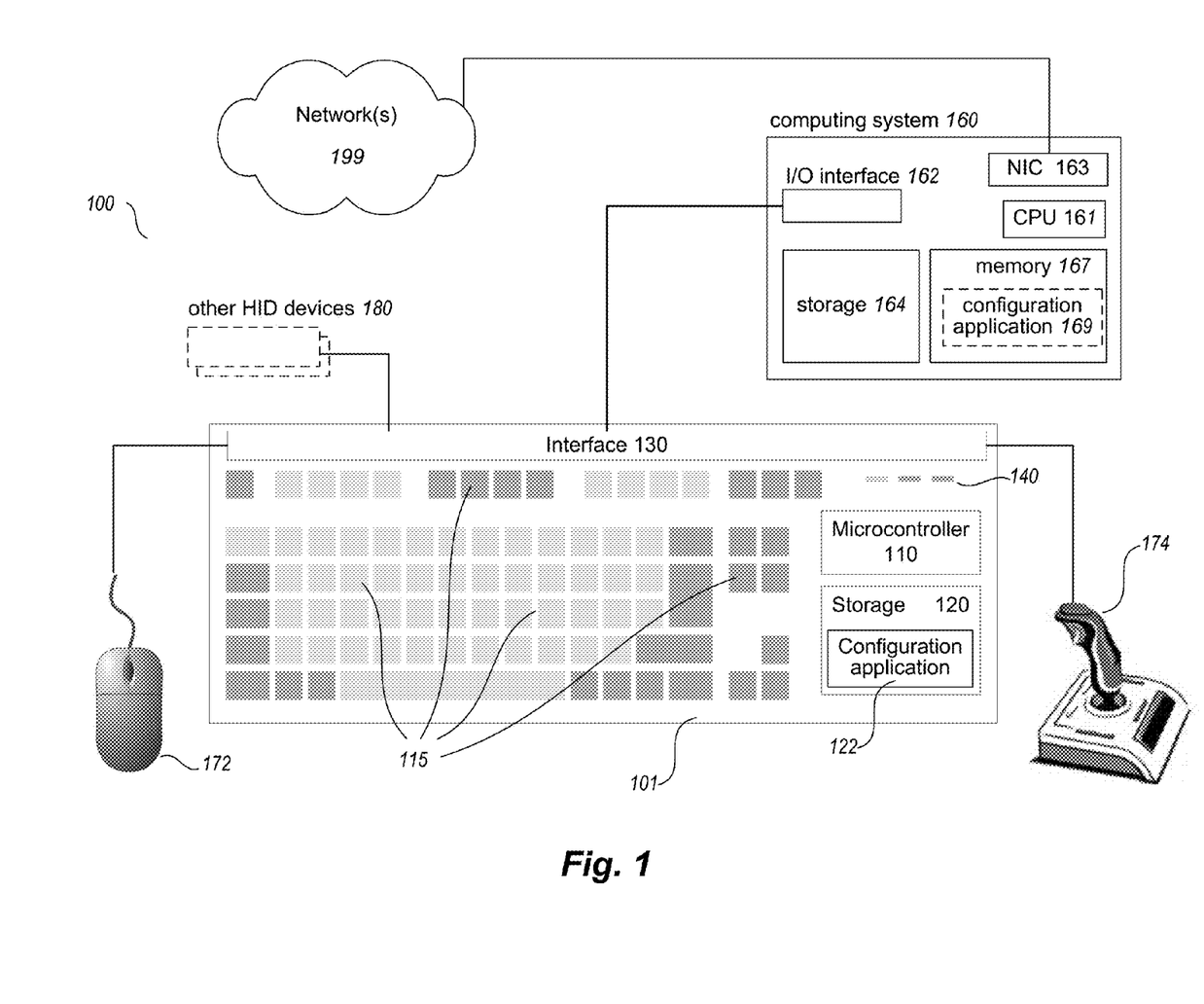
FIG. 1 is a schematic diagram of a connected environment that illustrates various features of implementations of human interface devices and related techniques described herein.

FIG. 1 is a schematic diagram of a connected environment 100 that includes a HID keyboard device 101, hereinafter referred to in this example as "keyboard 101." The keyboard 101 includes a microcontroller 110; a plurality of buttons (actuators) 115; storage 120 (which as depicted stores one or more versions of a graphical configuration application 122); an interface 130; and visual indicators 140. In the depicted environment, the keyboard 101 is communicatively coupled (such as via a USB or other I/O port) to a computing system 160, which includes a processor 161, I/O interface 162, network interface 163, storage 164, and memory 167 (which as depicted may be executing a copy of configuration application 169, such as may have been retrieved from storage 120 of the keyboard 101).

In certain implementations, a HID device in accordance with the techniques described herein may operate as a hub for other devices, including additional HID devices. For example, in the environment of FIG. 1, keyboard 101 is communicatively coupled to a pointing device 172 and joystick device 174, and may additionally be connected to other HID devices 180. The configuration of each of these HID devices may include enumeration of those devices according to a particular device type. Enumeration may be typically described as the process of detecting and identifying (and in certain scenarios, loading drivers for) a device that is connected to a computing system, such as a HID device. While a computing system may initiate enumeration or re-enumeration of devices under particular circumstances, in some implementations a HID device such as keyboard 101 may determine to initiate re-enumeration in various manners and for various purposes, as described in greater detail elsewhere herein.

In some implementations, a memory included in the HID device (such as storage 120 included by keyboard 101 in FIG. 1) or portion thereof may be made accessible to an attached computing system and enumerated as a virtual generic storage volume or "virtual drive," equivalent to a removable disk drive such as a flash memory drive. In this manner, files stored using the virtual drive may be viewed, added, deleted, or modified. For example, such files may include instructions, examples, and one or more configuration files for the HID device. In certain implementations, a configuration file may be a simple text file. Furthermore, multiple configuration files may be used for different purposes and can be identified by the microcontroller 110 by file name, by location (e.g., via a subfolder name), or other suitable manner. In at least one implementation, if accessibility of a virtual drive is considered undesirable (such as based on security concerns), the re-enumeration process may be prevented after the desired configuration has been achieved. This "memory locking" can be accomplished, for example, by installing modified firmware (for example after factory-loading of a customized configuration file onto the memory chip of the device) or by installing or removing a hardware component (e.g., a jumper wire) required for re-enumeration to enable access to the virtual drive. The microcontroller may in such implementations retain full access to the configuration data for operating the HID device in accordance with the desired configuration.

In various implementations, configuration of a HID device may be limited to occurring while the HID device is in a distinct mode of operation. For example, in the depicted implementation of FIG. 1 the keyboard 101 may operate in a first "normal" mode of operation in which interactions with the buttons 115 initiate the providing of electronic signals to the connected computing system 160 in a manner previously defined (such as via a default configuration or configuration previously modified by a user). In addition, the keyboard 101 may operate in a second "configuration" mode in which the actions initiated by user interactions with the buttons 115 may be configured by the microcontroller based on one or more textual configuration files (such as may be stored as part of storage 120). In this manner, particular keys, buttons, pedals or other actuators of the relevant HID device may be assigned different actions. In certain implementations, configuration changes are saved and implemented by the HID device in normal mode only upon exiting the configuration mode in which such modifications were performed.

Initiating a change between modes may be accomplished in various manners, such as by defined user interactions with one or more of the buttons 115 of keyboard 101 (or other actuators of the relevant HID device); defined user interactions with the actuators of the HID device when the HID device is first connected to a computing system or when a connected computing system is first powered or "booted"; receiving a software instruction from a computing system coupled to the HID device; etc.

In at least one implementation, initiating a configuration mode of the HID device may include re-enumerating the HID device as a distinct set of devices, such as to enumerate the keyboard 101 as both the HID keyboard device and the virtual drive (by which some or all of storage 120 is made accessible to the computing system 160). Similarly, initiating the normal mode of the HID device may include re-enumerating the HID device as a distinct other set of devices, such as to enumerate the keyboard 101 as the HID keyboard device alone (i.e., without providing access to the virtual drive). Furthermore, in various implementations the HID device may enable a user to initiate re-enumeration of the input device as a different HID device or combination of devices. For example, with reference to FIG. 1, the keyboard 101 may be configured in a manner so as to be enumerated as a HID keyboard device as well as a pedal controller (such as may be useful for games that simulate vehicle driving, or other purposes), with a relevant configuration file indicating that interactions with particular buttons 115 are to initiate sending signals to the connected computing system 160 in a manner that represents the user depressing one or more pedals of the enumerated pedal controller rather than signals indicating the actual interactions with keys of the HID keyboard device.

Thus, in various configurations a user may utilize the HID device to emulate the functionality of various combinations of other HID devices, either in conjunction with or in lieu of enumeration of keyboard 101 as an actual HID keyboard device. In a similar manner, the keyboard 101 may be configured to enumerate other attached HID devices (such as pointing device 172, joystick 174 or other HID devices 180) as being other types of devices—for example, enumerating attached joystick 174 as a driving wheel device. In at least some implementations, the enumeration of these virtual devices may allow the connected computing system 160 to utilize generic device drivers of the indicated type rather than relying upon specialized device drivers. Since multiple types of HID devices can be enumerated based on a single configuration of a single HID device, such configuration may change the combination of devices (or virtual devices) indicated as active. Such configuration includes modifying the specific actions associated with particular keys, buttons, pedals or other actuators of the device. According to at least one implementation, the HID device may include non-volatile memory (such as storage 120 of keyboard 101 as depicted in FIG. 1) which stores an indication of the active configuration. In a manner similar to that described elsewhere herein with respect to changing between "normal" and "configuration" modes, a microcontroller of the HID device may initiate changing between various configuration files (and, in certain scenarios, device enumerations specified by and/or associated with such configuration files) in various manners, such as upon detecting defined user interactions with one or more actuators of the HID device; detecting defined user interactions with the actuators of the HID device when the HID device is first connected to a computing system or when a connected computing system powered on or otherwise initialized; or receiving software instructions from a connected computing system.

In particular implementations, various modes or current configurations of a HID device may be indicated by one or more visual indicators of the HID device, such as visual indicators 140 of the keyboard 101 depicted in FIG. 1. In at least some implementations, such visual indicators may be configured in a manner similar to other configuration of the HID device. For example, a configuration file activated by microcontroller 110 may indicate particular visual indicators 140 (or combinations thereof) to be associated with that configuration file; to be associated with a configuration mode of the keyboard 101; etc. In this manner, visual indicators 140 may provide an indication of a particular configuration file or mode currently used by the HID device.

In the depicted environment of FIG. 1, computing system 160 is connected to one or more computer networks 199, such as to retrieve a version of graphical configuration application 169 that is not currently available directly via storage 120 of the keyboard 101, or facilitate the generation of one or more textual configuration files for use with the keyboard 101 by accessing such a graphical configuration application remotely. For example, if the connected computing system utilizes an operating system for which a version of the graphical configuration application is not stored in the HID device, the HID device may provide additional versions of such a graphical application by directing a user or the connected computing system to one or more additional versions of the graphical application, such as may be stored via a remote network-accessible server. In at least one implementation, the HID device may direct a user or the connected computing system to a version of the graphical application executed remotely by such a network-accessible server, such as via a web browser executing on the connected computing system. In the depicted connected environment 100 of FIG. 1, the network 199 is a publicly accessible network of linked networks, possibly operated by various distinct parties, such as the Internet. In other implementations, the network 199 may have other forms. For example, the network 199 may instead be a private network, such as a corporate or university network that is wholly or partially inaccessible to non-privileged users. In still other implementations, the network 199 may include both private and public networks, with one or more of the private networks having access to and/or from one or more of the public networks. Furthermore, the network 199 may include various types of wired and/or wireless networks in various situations.

Figure 2:
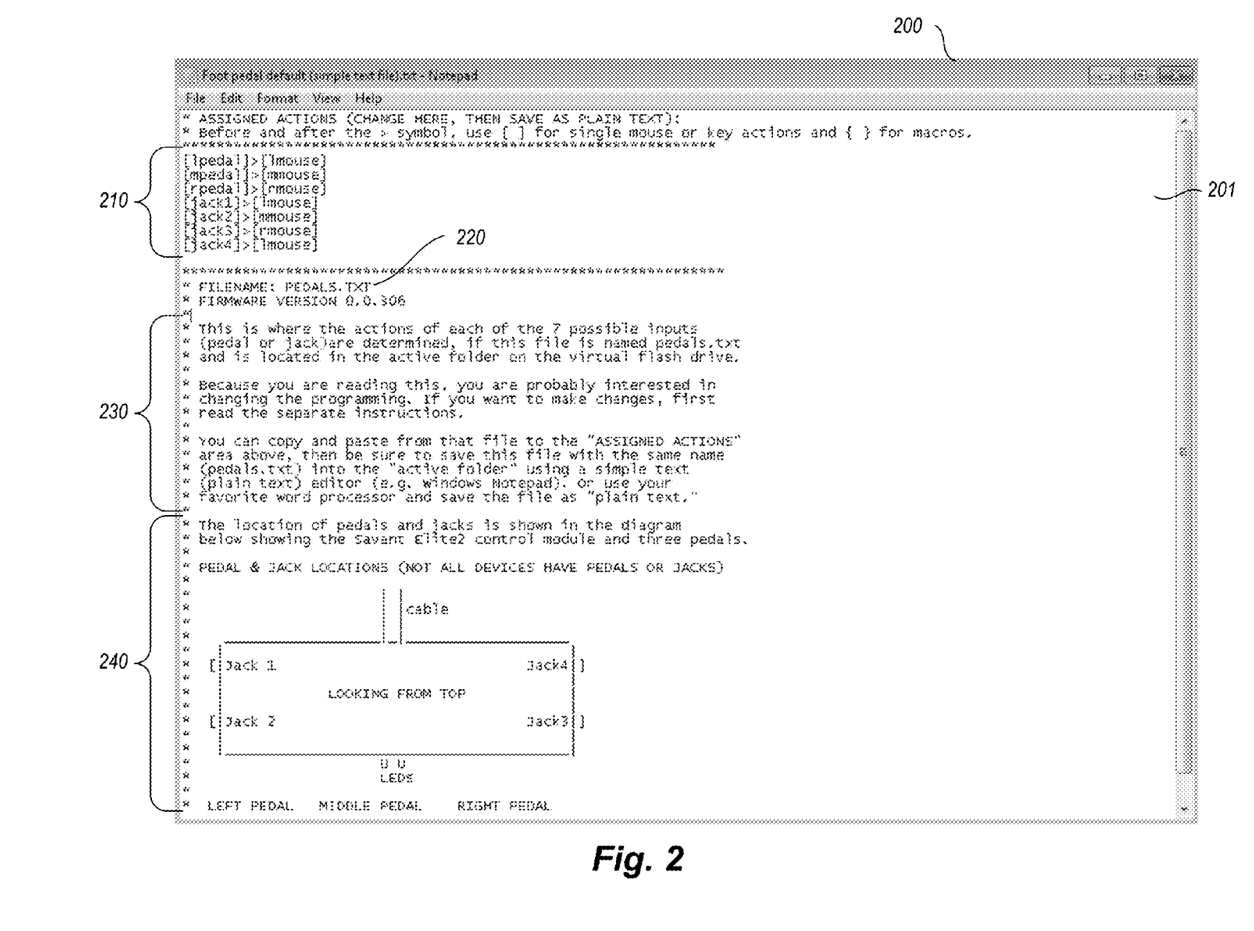
FIG. 2 depicts one representation of a textual configuration file for modifying functionality of one or more human interface devices, in accordance with one implementation of techniques described herein.
Figure 3:
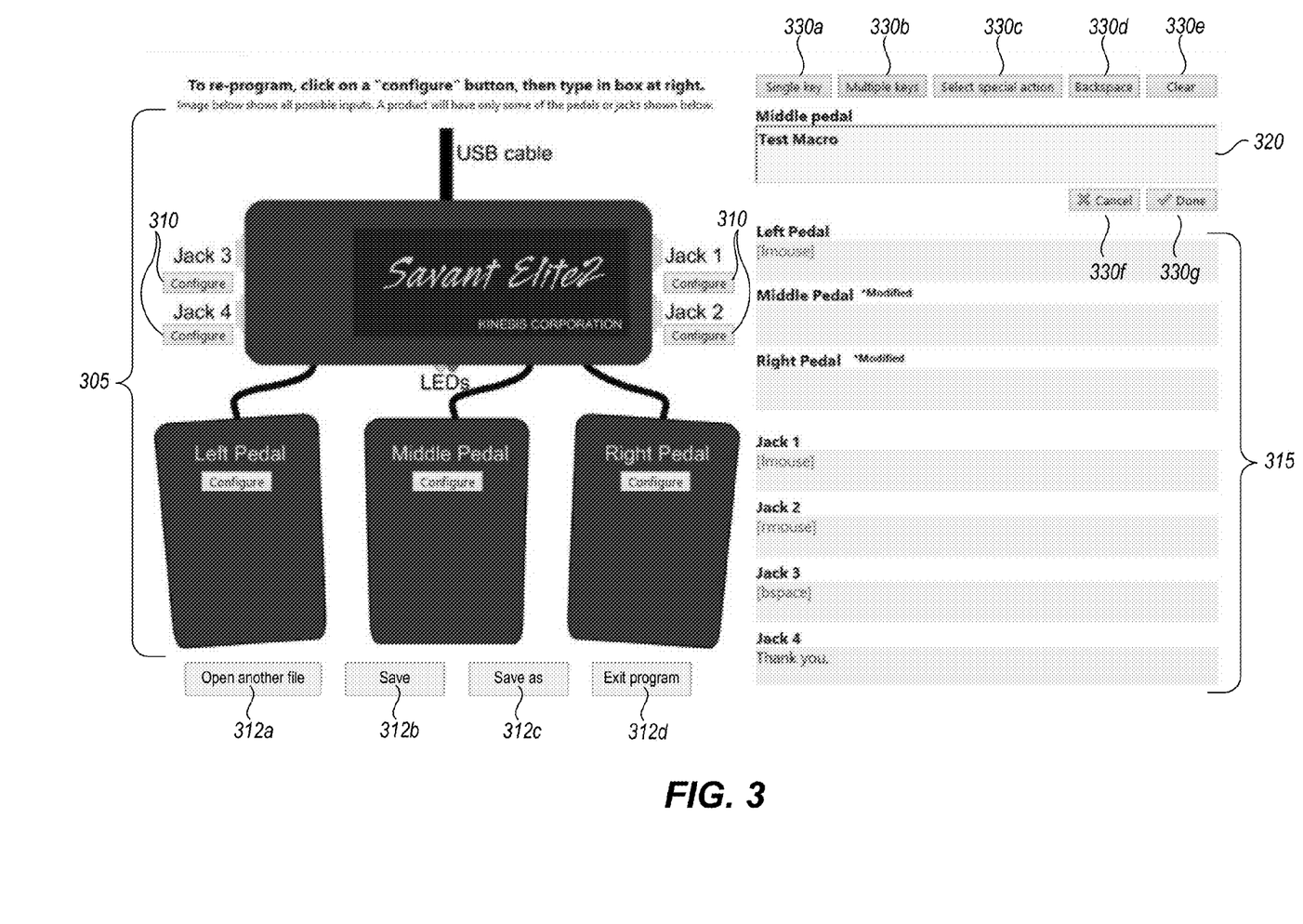
FIG. 3 depicts a graphical user interface that includes various user-selectable controls for indirectly modifying textual configuration information to configure one or more human interface devices in accordance with an implementation of techniques described herein.

FIG. 2 depicts a graphical user interface 200 that includes one representation of a textual configuration file 201 for modifying functionality provided by one or more HID devices. In the depicted example, an assignment portion 210 specifies particular actions to assign to various actuators of a HID device, while the remainder of the textual configuration file includes comments (in the depicted implementation, preceded by the "*" character) to provide information to any user viewing or modifying the configuration file. In particular, comment 220 specifies a filename in which the comment was originally located ("PEDALS.TXT"); comment portion 230 provides documentation related to modifying the textual configuration file; and comment portion 240 indicates "Pedal and Jack locations" related to the textual configuration file.

According to some implementations, a particular file name may be recognized by a microprocessor of the HID device as a primary configuration file (e.g., pedal.txt may be recognized as the primary configuration file for a foot pedal device). Alternatively, a specific virtual folder can be designated, such that one or more textual configuration files stored in the designated virtual folder may be used as the configuration file. According to some implementations, a specific folder (e.g., a folder named "active") may include one or more textual configuration files to be used as a default configuration.

In various implementations, textual configuration files may include either differential or complete actuator assignments. That is, such files may list coded information which includes only assignments that differ from a set of default assignments associated with the HID device (differential assignments), or it can list all assignments for the HID device and its actuators (complete assignments). In some instances, for complex devices like keyboards, it may be desirable to only list differences in relation to default assignments. However, for simpler devices like a mouse, or a foot pedal emulating a keyboard or mouse, it may be desirable to list all assignments.

In certain implementations, the virtual drive may be accessible (such as when the HID device is in a "configuration" mode) while the HID device remains operational, enabling the user to view, copy, modify, delete or resave textual configuration files even if the HID device is used to do so (such as if the HID device is a pointing device or keyboard device used to interact with a connected computing system during such operations). For example, with reference to FIG. 1, keyboard 101 may remain fully operational while the virtual drive is open in order to modify one or more textual configuration files stored within storage 120. In certain scenarios and implementations, if "end points" allowing for enumeration of devices are limited, the microprocessor may determine to deactivate one device in order for the virtual drive to be enumerated (and therefore accessible); the microcontroller may similarly determine to reactivate the device when access to the virtual drive is no longer necessary (such as when returning the HID device to a "normal" mode of operation). In certain implementations, the microprocessor of the HID device may determine to delay use of a modified textual configuration file until various criteria are satisfied, such as until the virtual drive is closed or de-enumerated, or until an indication is received to initiate a "normal" mode of operation for the HID device. In at least one implementation, if a particular textual configuration file is deleted or rendered unusable via such modifications, the microprocessor of the HID device may recreate a default textual configuration file in place of the deleted or unusable configuration file.

In some implementations, a file generated elsewhere may be copied to an appropriate location on the virtual drive (e.g., the designated 'active' folder). For example, a manufacturer or dealer of various products could provide particular textual configuration files for such products (or for specific tasks with respect to such products) and make them available to users via one or more computer networks (such as network 199 of FIG. 1) or other communication means.

A textual configuration file may, in certain implementations, define a single or multiple actions to be assigned to a particular actuator of the HID device. In one implementation, the text file may use special but simple coding (such as one or more markup syntaxes) to differentiate between single (remapping) or multiple actions (macro), in part because single actions are most often treated differently (e.g., with respect to auto-repeat) than multiple actions. For example, remapping a key could require it be listed in the text file enclosed by square brackets ("[" and "]") showing the physical location, followed by an assignment indicator (e.g., ">") then the new action also enclosed by square brackets. In contrast, a multiple-action macro assigned to a key or combination of such a key with one or more modifiers (such as <SHIFT> or <ALT> actuators) could be designated, for example, by curly braces ("{" and "}"), followed by the assignment indicator and the actions to be produced, also encoded by curly braces. Where supported by the operating system, a textual configuration file may indicate assignments of combinations of two or more HID devices can be used, such as a "control-click," (combining a keyboard <CTRL> or other control key actions with a mouse button action).

In certain implementations, a dictionary or syntactical guide describing defined, named actions (e.g. keyboard key actions, multimedia actions, mouse and mouse button actions) may be provided as a digital User's Manual, such as via one or more remote servers, by storage within a memory of the HID device itself, or other appropriate manner. A user may simply copy and paste text from examples to the "active folder" of the virtual drive, then further edit the text if desired.

In one implementation of a macro, each action to be produced has a "down" (press) and an "up" (release) state. For example, a macro triggered by the <tab> key (found in the onboard dictionary of keyboard actions) that produces the word "hi" may appear as follows:

{tab}>{-h}{+h}{-i}{+i}

In this particular syntactical example, the actuator to be assigned an action (the <TAB> key) is included first; then the assignment indicator (">"); and then the actions to be assigned to the actuator—in particular, in this example the press and release of the "h" key and the subsequent press and release of the "i" key. In this example, either -h or -H could be used with the same result, for simplification of parsing the text file by the microcontroller of the HID device.

In some implementations, a simplified syntax may be used for actions in which a given character may represent both a press action and a release action with respect to the relevant key, such as using [s] as a shorthand syntax to represent [-s][+s]. This simplified syntax may be supplemented with the longer version (as shown above) where it is desirable to separately indicate the relevant "press" and "release" actions, such as when using a modifier key. For example, to introduce a capitalized "h" into the above example, "shift" could be used. The dictionary could desirably include separate indications of left-shift and right-shift, but simply "shift" would be acceptable for simplicity. In the following example, the simplified syntax for a key action is shown for "h" and "i" but the modifier "shift" is indicated with the appropriate pairing of distinct press and release actions:

{tab}>{-shift}{h}{+shift}{i}

Note that in this example, the shift actions "bracket" the "h" actions, indicating that the <SHIFT> key is pressed before the "h" is pressed and released and then released before the "i" is pressed and released.

As indicated elsewhere herein with respect to FIG. 2, comments within textual configuration files may be ignored by the microcontroller, and may serve as instructions or reminders to users, for example by preceding them with one or more * characters, such as in the following example of a comment:

* below is a macro triggered by the tab key which produces "Hi"
{tab}>{-shift}{-h}{+h}{+shift}{-i}{+i}

Note that by extensive use of copy and paste, actual repetitive typing can be reduced. However, even so, in the case of a keyboard, it may be desirable to use onboard direct programming which eliminates the need for typing coding elements. Subsequently, the newly-modified configuration file can be opened, reviewed, and edited if desired. In another implementation, a user could type normal text with caps and lower case and have those actions implemented without coding by a different parsing utility built into the firmware. The different parsing utility would add any coding needed in the text file used by the microcontroller.

In various implementations, a HID device utilizing textual configuration files may receive an indication of particular language drivers used by a connected computing system during modification of the textual configuration file. However, such configuration files may in certain implementations use standardized, language-independent codes for their actions such that the HID device does not have to be electronically adapted to different languages. Thus, rather than language-specific keyboards, the connected computing system may interpret a relevant key code into the appropriate character or actions based on the language driver that has been selected. In such implementations, only the keycap legends may be adapted to different a language, which may simplify the manufacturing of the HID device. When configuring the HID device, a single language may be selected (such as U.S. English) to be used within the textual configuration file and in any digital dictionary provided to facilitate editing the textual configuration file. However, a language-specific parser may, in certain implementations, be included in firmware of the microprocessor of the HID device. In such implementations, after receiving an indication of a user selection of the language used within the textual configuration file or with appropriate key commands, textual information entered by the user may be converted to the U.S. English version for use by the microcontroller. Language selection may significantly impact particular appropriate "bracket" keys to emulate actions of U.S. English characters used for writing or editing configurations (e.g. square brackets, curly braces, etc.).

FIG. 3 depicts a graphical user interface 300 that includes various user-selectable controls for indirectly modifying textual configuration information files in order to configure one or more HID devices. As indicated elsewhere herein, in certain implementations a graphical application (such as graphical configuration 122 of FIG. 1) may be used to prompt the user to program the device and automatically write the changes to the appropriate file in the appropriate folder. Such applications may in certain implementations be as small as 500 kb in file size, and thus may be stored within onboard storage of the HID device even when such storage is significantly limited. The graphical application may in certain implementations be designed to execute automatically upon certain criteria being satisfied, such as when the virtual drive is accessed or enumerated, and/or upon initiation of a "configuration" mode of the HID device. Operating systems that don't support such automatic execution may require the user to manually initiate the execution of the graphical configuration application.

In the depicted implementation, GUI 300 includes a graphical representation 305 of the programmable physical hardware, an editing field 320 where syntax-appropriate descriptions of single actions or combinations of actions may be entered, and a display portion 315 to display actions currently assigned to actuators of the HID device being configured. The GUI further includes user-selectable file controls 312a ("Open another file"), to allow the user to open another textual configuration file for modification; 312b ("Save"), to allow the user to save the current textual configuration file under its current filename; 312c ("Save as"), to allow the user to save the current textual configuration file using another filename; and 312d ("Exit program"), to allow the user to exit the graphical configuration application. In addition, editing field 320 is placed adjacent to user-selectable controls 330a, allowing the user to indicate that the editing field is to be interpreted as containing a single action; 330b, allowing the user to conversely indicate that the editing field is to be interpreted as containing multiple actions (or a "macro" action); 330c, allowing the user to select from additional special actions (not shown) to be entered into the editing field; 330d, allowing the user to insert a "backspace" operation into the editing field; 330e, allowing the user to remove all text currently within the editing field; 330f, allowing the user to cancel any modifications made to the actions described within the editing field; and 330g, allowing the user to commit such modifications to a version of the textual configuration file currently open for modification.

In various implementations, the GUI 300 may include a distinct editing field for each user-selectable actuator (e.g., each foot pedal associated with the HID device being configured) or, as depicted, a single editing field that may allow the user to modify textual actions with respect to multiple such actuators. Within each editing field, the currently programmed command from the underlying textual configuration file may be displayed to the user. For example, during an initial execution of the graphical configuration application, the displayed editing fields may include factory-programmed default command(s) associated with each user-selectable actuator.

In certain implementations, the graphical configuration application may translate some or all of the underlying stored keystroke sequence from the underlying textual configuration file (as shown in FIG. 2) into formatted text, showing (for example) shifted characters, spaces, and punctuation. Actions which cannot easily be shown may be presented in a manner that identifies them as actions rather than as text. For example, an action such as depressing and releasing an <ENTER> key could be shown in brackets as "[enter]". In one implementation, an action may also be shown in a different color or font than formatted text.

In the depicted implementation, by selecting particular actuator entries from display portion 315, the user can view and edit actions assigned to the relevant actuator, either by typing new syntax-appropriate actions into the editing field 320 or by choosing such actions from a menu of pre-populated actions (such as may be displayed upon user selection of user-selectable control 330c). Once the user has finished editing such actions using the editing field, the user may select control 330g to save any indicated changes to the current textual configuration file.

Various displays may be included in GUI 300. For example, the GUI may include a hot-linked image of all possible pedals and jacks for a foot pedal HID device along with a corresponding textual representation of the action(s) currently assigned to each such pedal and jack. When the user selects a pedal or jack, the currently assigned action is displayed. Where possible, the command will be translated into the plain language command rather than the raw command as stored in the textual configuration file. Similarly, the GUI may include a graphical representation of a keypad (such as may be included by a HID keyboard device such as keyboard 101 of FIG. 1) with a single editing field being depicted adjacent to the keypad. The user may select a specific key for assignment by using a mouse or other pointing device to select the key on the graphical image of the keypad. Such selection may result in the graphical configuration application highlighting the editing field to show what command (if anything) is currently assigned to the corresponding actuator of the HID keyboard device.

In various implementations, the graphical configuration application may provide multiple named layouts, between which the user can quickly toggle. Since a HID keyboard device may be provided with more than one predefined layout, the user may be enabled to select a representative graphical image for such a layout within the GUI provided by the graphical configuration application. By default, for example, a keyboard may have a QWERTY layout and a Dvorak layout, either or both of which may be further customizable. This approach may also be used to support various language versions in which a keyboard might be sold, though language-specific versions of the pop-up could also be provided to keep their file size to a minimum.

In some implementations, the user may also create and save a new layout by designating a key (such as any assignable actuator, excluding modifiers and keys for use in configuring the HID device). Textual configuration files containing the customizations may be named with a token which is used to identify that key, followed by the name of the base layout (QWERTY or Dvorak) that was active at the time the special layout was named. For example, a textual configuration file may be named "a_qwerty.txt" or "pup_dvorak.txt" ("pup" being the token for the "Page Up" command). A separate textual configuration file may be created for each named version.

In order for the graphical application to be able to automatically open a particular designated file when it is run, implementations which allow for multiple text files (such as a keyboard with QWERTY, Dvorak, and specially-named layouts) may employ a naming convention for identification of the active file. For example, the active textual configuration file may be renamed by the microprocessor of the HID device when it is selected as the active file, such as by adding a special character to the beginning of the file name (e.g., #qwerty.txt or #pup_dvorak.txt). The microprocessor may further rename the textual configuration file that was most previously active by removing the special character from its filename. In certain implementations, a user may not be allowed to change the active file while the graphical application is running.

In view of the above, it is appreciated that, according to at least one implementation, a method may be summarized as including: detecting, by a microcontroller of a human interface device ("HID device") while the HID device is in a first operating mode, user interaction with one or more of a plurality of actuators of the HID device; initiating, by the microcontroller and based at least in part on the detected user interaction, a distinct second operating mode of the HID device; receiving, by the microcontroller and while the HID device is operating in the distinct second operating mode, textual configuration information from a computing system communicatively coupled to the HID device, the textual configuration information indicating one or more actions to assign to a specified one of the plurality of actuators; associating, by the microcontroller and based on the textual configuration information, the indicated one or more actions with the specified one actuator; after the associating of the indicated one or more actions with the specified one actuator, initiating, by the microcontroller, the first operating mode of the HID device; and providing, by the microcontroller and responsive to user interaction with the specified one actuator while the HID device is operating in the first operating mode, one or more electronic signals to the coupled computing system that are representative of the indicated one or more actions.

The method may further include storing the received textual configuration information in a memory of the HID device. The method may further include providing access for the coupled computing system to at least a portion of the memory of the HID device as a virtual storage volume. The method may further include providing a graphical user interface via an application stored in the memory of the HID device for display by the coupled computing system, and wherein at least some of the textual configuration information may be generated by the coupled computing system based on one or more user interactions with the graphical user interface.

At least some of the textual configuration information may be generated by the coupled computing system based on a sequence of user interactions with one or more of the plurality of actuators. Generating the at least some textual configuration information by the coupled computing system may include recording the sequence of user interactions with the one or more actuators, and wherein providing the one or more electronic signals to the coupled computing system may include providing electronic signals representative of the sequence of user interactions with the one or more actuators. Associating the indicated one or more actions with the specified one actuator may include selecting one of multiple textual configuration files in a memory of the HID device, and wherein the method may further include receiving an indication from the coupled computing system to select the one textual configuration file. Associating the indicated one or more actions with the specified one actuator may include associating with the specified one actuator a single interaction with one of the plurality of actuators other than the specified one actuator. Associating the indicated one or more actions with the specified one actuator may include associating with the specified one actuator multiple interactions with at least some of the plurality of actuators. The HID device may be a first of multiple HID devices communicatively coupled to the computing system, wherein one or more other of the multiple HID devices may be communicatively coupled to the computing system via the first HID device, wherein the received textual configuration information may include one or more additional actions to assign to an additional specified actuator of at least one of the one or more other HID devices, and wherein the method may further include associating, by the microcontroller of the first HID device, the one or more additional actions with the additional specified actuator of the at least one other HID device. The one or more other HID devices may include at least one of a group that includes a pointing device, a pedal device, and a joystick device.

The method may further include initiating enumeration of the HID device as a first set of one or more devices, and initiating re-enumeration of the HID device as a distinct second set of one or more devices. Initiating the distinct second operating mode of the HID device may include re-enumerating the HID device as the distinct second set of one or more devices.

The method may further include determining, by the microcontroller of the HID device, to initiate the re-enumerating of the HID device as the distinct second set of one or more devices based on detecting one or more user interactions with at least one actuator of the HID device.

The method may further include determining, by the microcontroller of the HID device, to initiate the re-enumerating of the HID device as the distinct second set of one or more devices based on detecting one or more additional HID devices being communicatively coupled to the HID device.

Each of the enumerating of the HID device and the re-enumerating of the HID device may be performed using one or more generic device drivers of the coupled computing system. The distinct second set of one or more devices may include at least one of a group that includes a keyboard, a pointing device, a joystick, a pedal control, a musical instrument, and a storage volume. Initiating the distinct second operating mode of the HID device may include providing an indication of the distinct second operating mode via one or more indicators of the HID device.

According to another implementation, a computer input system may be summarized as including: a plurality of user-selectable actuators of a first human interface device; at least one memory of the first human interface device; and a microcontroller of the first human interface device, operable to: detect, while in a first operating mode, a defined user interaction with one or more of the plurality of actuators; initiate, based at least in part on detecting the defined user interaction with the one or more actuators, a distinct second operating mode; receive, while in the second operating mode, configuration text that specifies at least one action to assign to an indicated one of the plurality of actuators; initiate, after receiving the configuration text, the first operating mode; and provide, based on the configuration text and responsive to detected user interaction with the indicated one actuator while in the first operating mode, one or more signals representative of the specified at least one action to a distinct and separate computing system communicatively coupled to the first human interface device.

The microcontroller may be further operable to provide access for the coupled computing system to at least a portion of the at least one memory as a virtual storage volume. The microcontroller may be further operable to provide a graphical user interface via an application stored in the at least one memory for display by the coupled computing system, and wherein at least some of the configuration text may be received from the coupled computing system based on one or more user interactions with the graphical user interface. The microcontroller may be further operable to: store the configuration text as one of multiple textual configuration files in the at least one memory; and select one or more indicated textual configuration files for use in determining to associate one or more actions with one or more specified actuators. Selection of the indicated one or more textual configuration files may be based on one or more detected user interactions with at least one of the plurality of actuators, the at least one actuator being associated with the indicated one or more textual configuration files. Selection of the indicated one or more textual configuration files may be based on one or more electronic communications received from the coupled computing system.

The system may further include one or more second human interface devices communicatively coupled to the first human interface device, wherein the received configuration text may include one or more additional actions to assign to an additional specified actuator of at least one of the second human interface devices, and wherein the microcontroller may be further operable to associate the one or more additional actions with the additional specified actuator of the at least one second human interface device.

The microcontroller may be further operable to initiate enumeration of the first human interface device as a first set of one or more devices, and initiate re-enumeration of the first human interface device as a distinct second set of one or more devices. The microcontroller may be further operable to determine to initiate the re-enumeration of the first human interface device as the distinct second set of one or more devices based on one or more user interactions with at least one actuator of the first human interface device. The microcontroller may be further operable to determine to initiate the re-enumeration of the HID device as the distinct second set of one or more devices based on one or more second human interface devices being communicatively coupled to the first human interface device.

According to still another implementation, a method may be summarized as including: receiving, by a microcontroller of a human interface device ("HID device") while the HID device is in a first operating mode, textual configuration information from a computing system communicatively coupled to the HID device, the textual configuration information indicating one or more actions to assign to a specified one of the plurality of actuators; associating, by the microcontroller and based on the textual configuration information, the indicated one or more actions with the specified one actuator; after the associating of the indicated one or more actions with the specified one actuator, initiating, by the microcontroller, a distinct second operating mode of the HID device; and providing, by the microcontroller and responsive to user interaction with the specified one actuator while the HID device is operating in the distinct second operating mode, one or more electronic signals to the coupled computing system that are representative of the indicated one or more actions.

From the foregoing it will be appreciated that, although specific implementations have been described herein for purposes of illustration, various modifications may be made without deviating from the spirit and scope of the invention. Certain specific details have been set forth in order to provide a thorough understanding of various disclosed implementations. However, one of ordinary skill in the relevant art will recognize that implementations may be practiced without one or more of these specific details, or with other methods, components and functionality. In other instances, well-known structures, devices, features and methods associated with configurable computer input devices have not been shown or described in detail to avoid unnecessarily obscuring descriptions of the implementations. Moreover, the various aspects of the implementations described above can be combined to provide further implementations. These and other changes can be made to the implementations in light of the above-detailed description.

Accordingly, the invention is not limited except as by corresponding claims and the elements recited by those claims. In addition, while certain aspects of the invention may be presented in certain claim forms at certain times, the inventors contemplate the various aspects of the invention in any available claim form.

The invention claimed is:

1. A method, comprising:
receiving, by a microcontroller of a human interface device ("HID device") having a plurality of user-selectable actuators, textual configuration information indicating one or more actions to assign to a specified one of the plurality of user-selectable actuators;
associating, by the microcontroller and based on the textual configuration information, the indicated one or more actions with the specified one user-selectable actuator;
after the associating of the indicated one or more actions with the specified one user-selectable actuator, providing, by the microcontroller and responsive to user interaction with the specified one user-selectable actuator, one or more electronic signals representative of the indicated one or more actions to a computing system communicatively coupled to the HID device.

2. The method of claim 1, wherein the coupled computing system is a first computing system, and wherein the method further comprises:
receiving an indication that the HID device is no longer communicatively coupled to the first computing system;
detecting that the HID device has been communicatively coupled to a second computing system that is distinct and separate from the first computing system; and
responsive to user interaction with the specified one user-selectable actuator while the HID device is communicatively coupled to the distinct second computing system, and based at least in part on the associating of the indicated one or more actions with the specified one user-selectable actuator while the HID device was communicatively coupled to the first computing system, providing the one or more electronic signals to the second computing system.

3. The method of claim 2, wherein the textual configuration information is received from the coupled computing system.

4. The method of claim 1 further comprising, wherein the HID device is a first of multiple HID devices communicatively coupled to the second computing system, wherein one or more other of the multiple HID devices are communicatively coupled to the second computing system via the first HID device, and wherein the method further comprises, responsive to detecting that the first HID device has been communicatively coupled to the second computing system, initiating enumeration by the second computing system of the first HID device and of at least one of the one or more other HID devices.

5. The method of claim 1 wherein the HID device is a first of multiple HID devices communicatively coupled to the second computing system, wherein one or more other of the multiple HID devices are communicatively coupled to the second computing system via the first HID device, wherein the textual configuration information further indicates one or more additional actions to assign to an additional specified user-selectable actuator of at least one of the one or more other HID devices, and wherein the method further comprises associating the one or more additional actions with the additional specified user-selectable actuator of the at least one other HID device.

6. The method of claim 1 wherein the indicated one or more actions to assign to the specified one user-selectable actuator includes setting one or more configurable operational parameters of the HID device.

7. The method of claim 6 wherein setting one or more configurable operational parameters of the HID device includes assigning a value to one or more visual indicators of the HID device.

8. The method of claim 6 wherein setting one or more configurable operational parameters of the HID device includes initiating a specified operational mode of the HID device.

9. The method of claim 8 wherein the specified operational mode of the HID device enables modification of the textual configuration information.

10. The method of claim 1, further comprising storing the textual configuration information in a memory of the HID device.

11. The method of claim 10 wherein storing the textual configuration information in the memory of the HID device includes storing the textual configuration information in a first portion of the memory, and wherein the method further comprises facilitating modification of the textual configuration information stored in the memory of the HID device by providing access for the coupled computing system to at least the first portion of the memory as a virtual storage volume.

12. The method of claim 1, further comprising providing a graphical user interface via an application stored in a memory of the HID device for display by the coupled computing system, and wherein at least some of the textual configuration information is generated by the coupled computing system based on one or more user interactions with the graphical user interface.

13. The method of claim 1, further comprising storing the textual configuration information as one of multiple textual configuration files in a memory of the HID device, and selecting one or more indicated textual configuration files for use in determining to associate one or more actions with one or more specified user-selectable actuators.

14. A human interface device having a plurality of user-selectable actuators, at least one memory, and a microcontroller operable to:
receive, by the microcontroller, textual configuration information that specifies at least one action to assign to an indicated one of the plurality of user-selectable actuators;
provide, based at least in part on the textual configuration information and responsive to user interaction with the indicated one user-selectable actuator at a first time, one or more electronic signals representative of the specified at least one action to a first computing system that is communicatively coupled to the human interface device;
determine, at a later second time, that the human interface device has been communicatively coupled to a distinct second computing system; and
responsive to user interaction with the indicated one user-selectable actuator while the human interface device is communicatively coupled to the distinct second computing system, and based at least in part on the textual configuration information, provide the one or more electronic signals to the distinct second computing system.

15. The human interface device of claim 14, wherein the microcontroller is further operable to initiate, responsive to a determination that the human interface device has been communicatively coupled to the second computing system, enumeration of the human interface device by the second computing system.

16. The human interface device of claim 15, wherein the textual configuration information is received from the first computing system.

17. The human interface device of claim 14, wherein the microcontroller is further operable to provide access for a communicatively coupled computing system to at least a portion of the at least one memory as a virtual storage volume, and to store the textual configuration information in the virtual storage volume.

18. The human interface device of claim 14 wherein the microcontroller is further operable to:
store the textual configuration information as one of multiple textual configuration files in the at least one memory; and select one or more indicated textual configuration files for use in determining to associate one or more actions with one or more specified user-selectable actuators.

19. The human interface device of claim 18 wherein selection of the indicated one or more textual configuration files is based at least in part on one or more user interactions with at least one of the plurality of user-selectable actuators.

20. The human interface device of claim 18 wherein selection of the indicated one or more textual configuration files is based at least in part on a human language associated with the indicated one or more textual configuration files.

21. The human interface device of claim 14, wherein the microcontroller is further operable to provide a graphical user interface for display by a communicatively coupled computing system via an application stored in the memory of the human interface device, and wherein at least some of the textual configuration information is generated by the first computing system based on one or more user interactions with the graphical user interface.

22. A computer-implemented method comprising:
receiving, by a microcontroller of a human interface device ("HID device") having a plurality of user-selectable actuators, configuration text specifying one or more actions to assign to an indicated one of the plurality of user-selectable actuators;

providing, by the microcontroller based at least in part on the configuration text and responsive to user interaction with the indicated one user-selectable actuator, one or more electronic signals representative of the specified one or more actions to a first computing system that is communicatively coupled to the HID device;

determining, by the microcontroller, that the human interface device has been communicatively coupled to a distinct second computing system; and providing, by the microcontroller based at least in part on the configuration text and responsive to additional user interaction with the indicated one user-selectable actuator while the human interface device is communicatively coupled to the distinct second computing system, the one or more electronic signals representative of the specified one or more actions to the distinct second computing system.

\* \* \* \* \*